US007126643B2

(12) United States Patent  
Song et al.

(10) Patent No.: US 7,126,643 B2
(45) Date of Patent: Oct. 24, 2006

(54) PROGRESSIVE SCAN METHOD USED IN DISPLAY USING ADAPTIVE EDGE DEPENDENT INTERPOLATION

(75) Inventors: Suk-beom Song, Suwon (KR); Yong-in Han, Seongnam (KR); Chang-won Huh, Suwon (KR); Hyen-aee Woo, Pusan Metropolitan (KR)

(73) Assignee: Samsung Electronics Co., Ltd. (KR)

( * ) Notice: Subject to any disclaimer, the term of this patent is extended or adjusted under 35 U.S.C. 154(b) by 477 days.

(21) Appl. No.: 10/743,633

(22) Filed: Dec. 22, 2003

(65) Prior Publication Data

US 2004/0135926 A1 Jul. 15, 2004

(30) Foreign Application Priority Data

Jan. 2, 2003 (KR) ............... 10-2003-0000100

(51) Int. Cl.
 H04N 7/01 (2006.01)
(52) U.S. Cl. .............. 348/448; 348/452; 348/458; 348/607; 382/300
(58) Field of Classification Search ........ 348/448–452, 348/607, 458, 700; 382/300
 See application file for complete search history.

(56) References Cited

U.S. PATENT DOCUMENTS

| | | | | | |
|---|---|---|---|---|---|
| 5,661,525 | A | * | 8/1997 | Kovacevic et al. | 348/452 |
| 5,774,573 | A | * | 6/1998 | Caspi et al. | 382/141 |
| 5,784,115 | A | * | 7/1998 | Bozdagi | 348/452 |
| 5,852,470 | A | * | 12/1998 | Kondo et al. | 348/448 |
| 5,886,745 | A | * | 3/1999 | Muraji et al. | 348/448 |
| 5,936,676 | A | * | 8/1999 | Ledinh et al. | 348/452 |
| 6,118,488 | A | * | 9/2000 | Huang | 348/452 |
| 6,151,416 | A | * | 11/2000 | Kondo et al. | 382/261 |
| 6,154,761 | A | * | 11/2000 | Kondo et al. | 708/300 |
| 6,192,161 | B1 | * | 2/2001 | Kondo et al. | 382/261 |
| 6,239,842 | B1 | * | 5/2001 | Segman | 348/448 |
| 6,307,979 | B1 | * | 10/2001 | Kondo et al. | 382/261 |
| 6,351,494 | B1 | * | 2/2002 | Kondo et al. | 375/240.27 |
| 6,418,548 | B1 | * | 7/2002 | Kondo et al. | 714/764 |
| 6,421,090 | B1 | * | 7/2002 | Jiang et al. | 348/452 |
| 6,507,364 | B1 | * | 1/2003 | Bishay et al. | 348/242 |
| 6,519,368 | B1 | * | 2/2003 | Kondo et al. | 382/260 |
| 6,519,369 | B1 | * | 2/2003 | Kondo et al. | 382/261 |
| 6,522,785 | B1 | * | 2/2003 | Kondo et al. | 382/254 |
| 6,621,936 | B1 | * | 9/2003 | Kondo et al. | 382/260 |
| 6,636,267 | B1 | * | 10/2003 | Adachi | 348/448 |
| 6,707,937 | B1 | * | 3/2004 | Sobel et al. | 382/162 |

(Continued)

FOREIGN PATENT DOCUMENTS

EP 550231 * 7/1993

(Continued)

Primary Examiner—Brian P. Yenke
(74) Attorney, Agent, or Firm—Mills & Onello LLP (57) ABSTRACT

Provided is a progressive scan method used in a display using adaptive edge interpolation. According to the progressive scan method, a final edge direction that satisfies a first edge-determination condition and a second edge-determination condition is detected by performing interpolation for 7×3 pixel windows, using code determination and a comparison of a standard deviation based on differences between luminances of pixel data divided by an edge boundary. As a result, directional edge interpolation is carried out in a region of a low gradient below 45° and to 27° at the minimum, and simple intra-field linear interpolation can be performed in a high-frequency texture region. Subsequently, it is possible to remove high-frequency noise introduced in edge dependent interpolation or unnatural screen display due to zigzagged edges, thereby improving the quality of a display.

7 Claims, 6 Drawing Sheets

U.S. PATENT DOCUMENTS

| | | | |
|---|---|---|---|
| 6,847,737 B1* | 1/2005 | Kouri et al. | 382/260 |
| 6,975,359 B1* | 12/2005 | Jiang | 348/348 |
| 7,043,091 B1* | 5/2006 | Michel | 382/266 |
| 7,050,108 B1* | 5/2006 | Nishibori et al. | 348/459 |
| 2003/0156301 A1* | 8/2003 | Kempf et al. | 358/486 |
| 2003/0218621 A1* | 11/2003 | Jiang | 345/698 |
| 2004/0114833 A1* | 6/2004 | Jiang | 382/300 |
| 2004/0126037 A1* | 7/2004 | Kim et al. | 382/300 |
| 2005/0018077 A1* | 1/2005 | De Haan et al. | 348/458 |

FOREIGN PATENT DOCUMENTS

| | | |
|---|---|---|
| JP | 9-37214 | 2/1997 |

* cited by examiner

(1) DIRECTION

(−1) DIRECTION

(2) DIRECTION

(−2) DIRECTION

(3) DIRECTION (−3) DIRECTION (4) DIRECTION (−4) DIRECTION

FIG. 6

(1) DIRECTION (−1) DIRECTION (2) DIRECTION (−2) DIRECTION (3) DIRECTION (−3) DIRECTION (4) DIRECTION (−4) DIRECTION

PROGRESSIVE SCAN METHOD USED IN DISPLAY USING ADAPTIVE EDGE DEPENDENT INTERPOLATION

CROSS-REFERENCE TO RELATED APPLICATIONS

This application claims the priority of Korean Patent Application No. 2003-100 filed on Jan. 2, 2003, the contents of which are incorporated herein in their entirety by reference.

BACKGROUND OF THE INVENTION

1. Field of the Invention

The present invention relates to a deinterlacer, and more particularly, to a progressive scan method using edge dependent interpolation.

2. Description of the Related Art

In general, deinterlacers convert video signals of an interlaced scanning format into those of a progressive scanning format.

The video signals of an interlaced scanning format are generally used in Korea, Japan, and the United States. The video signals of a progressive scanning format are used for high definition televisions (HDTV). The deinterlacers are intended to make these two scanning formats for video signals compatible with each other by converting video signals of the interlaced scanning format into those of the progressive scanning format.

One deinterlacing interpolation technique is edge dependent interpolation, which is related to spatial interpolation. Edge dependent interpolation is different from temporal interpolation that involves filling empty lines of the current field with interpolated data of the previous or further previous field data. That is, edge dependent interpolation is related to spatial interpolation that involves forming frame data by filling empty lines of the current field with interpolated data within the current field when progressive scanning using inter-field interpolation cannot be carried out because a difference between two fields is too large at moving portions of a displayed image.

Figure 1:
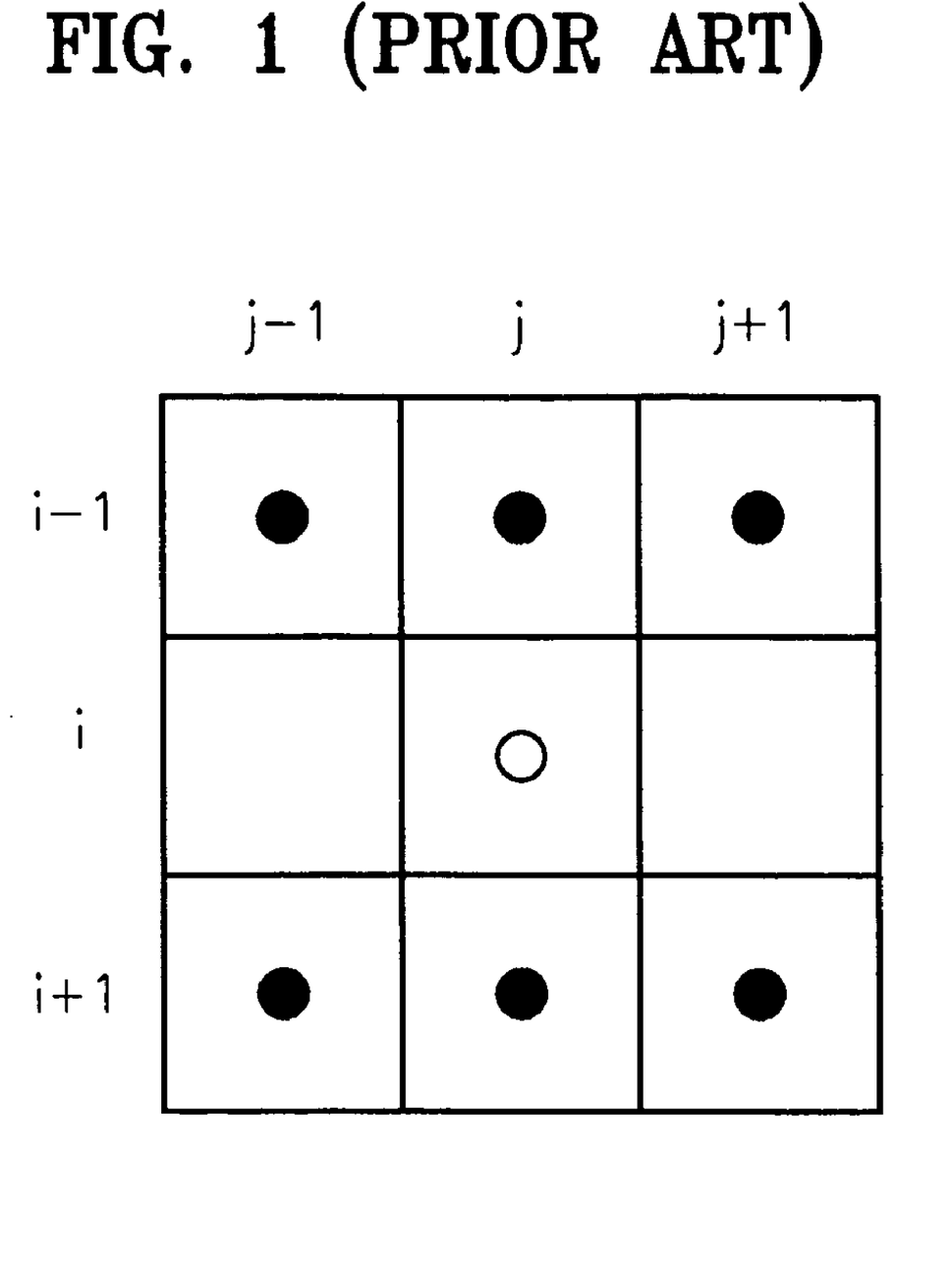
FIG. 1 is a diagram illustrating edge dependent interpolation used in a general progressive scan method used in a display.

FIG. 1 is a diagram illustrating edge dependent interpolation used in a general progressive scan method used in a display. Referring to FIG. 1, spatial interpolation used in a general progressive scan method used in a display is directed to determining 3×3 pixel windows with respect to respective center pixels that are to be interpolated, i.e., x (i, j), and computing interpolated pixel data, i.e., x̃ (i, j), which is obtained by progressively interpolating respective center pixels that are to be interpolated and to be filled in empty lines of the current field. At this time, since diagonal directions are at angles of 45° to horizontal lines, directions of edges are determined in relation to gradients of at least 45°.

In a case of edge dependent interpolation of 3×3 pixel windows as shown in FIG. 1, the interpolated pixel data, i.e., x̃ (i, j), is computed as follows:

$$\begin{cases} a \equiv |x[i-1, j-1] - x[i+1, j+1]| \\ b \equiv |x[i-1, j] - x[i+1, j]| \\ c \equiv |x[i-1, j+1] - x[i+1, j-1]| \end{cases} \quad (1)$$

$$\tilde{x}(i,j) = \begin{cases} (x(i-1, j-1) + x(i+1, j+1))/2, & \min(a,b,c) = a \\ (x(i-1, j+1) + x(i+1, j-1))/2, & \min(a,b,c) = c \\ (x(i-1, j) + x(i+1, j))/2, & \text{else} \end{cases} \quad (2)$$

In Equation 1, a, b, and c denote absolute differences between directional luminance of neighboring pixels of the center pixel x (i, j) that is to be interpolated. Thus, edge dependent interpolation is performed considering a direction in which luminance correlation is highest as a direction of an edge. Since the highest luminance correlation means the smallest change in directional luminance, edge dependent interpolation is carried out in a direction where the absolute difference between directional luminances is the smallest.

According to conventional edge dependent interpolation, a good display result is obtained in association with most general images. However, in relation to complex patterns with a number of high-frequency components, i.e., in a texture region, display quality is degraded even when compared with a progressive scan method that uses simple linear intra-field interpolation. Such degradation of display quality is caused by high-frequency noise introduced due to non-directional edge interpolation. Also, according to a progressive scan method using conventional edge dependent interpolation, directions of edges are determined in regions of gradients of at least 45° to horizontal lines by interpolation using 3×3 pixel windows. Thus, only simple linear interpolation is performed in a region of a low gradient below 45° without taking into consideration directional interpolation, which results in zigzagged edges.

SUMMARY OF THE INVENTION

To solve the above-described problems, the present invention provides a progressive scan method used in a display using adaptive edge dependent interpolation, in which directional edge interpolation is performed in a region of a low gradient below 45° and simple linear intra-interpolation is performed in a high-frequency texture region.

According to one aspect of the present invention, there is provided a progressive scan method used in a display. The display includes a deinterlacer that receives field data of an interlaced scanning format and converts the field data of the interlaced scanning format into frame data of a progressive scanning format according to edge dependent interpolation which is related to spatial interpolation. The progressive scan method comprises the following steps. The deinterlacer receives pixel data constituting field data. The deinterlacer determines pixel windows with respect to respective center pixels that are to be interpolated to empty lines of the field data and computes a standard deviation of pixel data of the lines of the field data, other than the empty lines in respective pixel windows, and computes the differences between pixel data according to predetermined directions. The dein terlacer computes the minimum absolute difference according to predetermined directions and determines a predetermined direction corresponding to the minimum absolute difference as a gradient direction. The deinterlacer detects a first edge direction where the standard deviation, the differences between pixel data according to the predetermined directions, and the determined gradient direction satisfy a predetermined first edge-determination condition. The deinterlacer detects a final edge direction where the standard deviation, the first edge direction, and the differences between pixel data divided by the first edge direction of an edge boundary satisfy a predetermined second edge-determination condition. The deinterlacer outputs an interpolated value corresponding to the final edge direction as interpolated pixel data.

In one embodiment, when the predetermined pixel windows have a size of 7×3 where there are pixel data G, H, A, B, C, L, and M of the first line, pixel data N, P, D, E, F, Q, and S of the third line, and pixel data T, U, V, W, X, Y, and Z of an empty line that are equal to averaged values of pixel data corresponding to the first edge direction, the number of predetermined directions is 9, and the differences between pixel data according to the predetermined directions, the absolute differences, the predetermined first edge-determination condition, the first edge direction, the differences between both pixel data divided by the first edge direction that is used as an edge boundary, the predetermined second edge-determination condition, and the final edge direction are determined by certain predetermined equations as set forth below.

In one embodiment, the differences between pixel data according to the predetermined directions are given by the following equations:

$af=A-F, be=B-E, cd=C-D, aq=A-Q, hf=H-F, cp=C-P$ $ld=L-D, as=A-S, hq=H-Q, gf=G-F, cn=C-N, lp=L-P$ $md=M-D, hs=H-S, gq=G-Q, mp=M-P, ln=L-N$

The absolute differences are given by $a'=|af|, b'=|be|, c'=|cd|,$ $d'=(|aq|+|hf|)/2, e'=(|cp|+|ld|)/2,$ $f'=(|as|+|hq|+|gf|)/3, g'=(|cn|+|lp|+|md|)/3,$ $h'=(|hs|+|gq|)/2, i'=(|ln|+|mp|)/2$ The predetermined first edge-determination condition and the first edge direction are computed by $Min=\min(a',b',c',d',e',f',g',h',i')$ $$STD(i,j) = \sqrt{\frac{1}{14}\sum_{i=0}^{1}\sum_{j=0}^{6}\{x(i,j)\}^2 - \frac{1}{14}\sum_{i=0}^{1}\sum_{j=0}^{6}x(i,j)}$$

$$Y\_dir = \begin{cases} -1, & (Min == a') \&\& (b' > STD) \&\& (c' > STD) \&\& (MSB[be] == MSB[cd]) \\ 1, & (Min == c') \&\& (a' > STD) \&\& (b' > STD) \&\& (MSB[af] == MSB[be]) \\ -2, & (Min == d') \&\& (b' > STD) \&\& (e' > STD) \&\& (MSB[be] == MSB[cp] == MSB[ld]) \\ 2, & (Min == e') \&\& (b' > STD) \&\& (d' > STD) \&\& (MSB[be] == MSB[aq] == MSB[hf]) \\ -3, & (Min == f') \&\& (b' > STD) \&\& (g' > STD) \&\& (MSB[be] == MSB[cn] == MSB[lp] == MSB[md]) \\ 3, & (Min == g') \&\& (b' > STD) \&\& (f' > STD) \&\& (MSB[be] == MSB[as] == MSB[hq] == MSB[gf]) \\ -4, & (Min == h') \&\& (b' > STD) \&\& (i' > STD) \&\& (MSB[be] == MSB[ln] = MSB[mp])] \\ 4, & (Min == i') \&\& (b' > STD) \&\& (h' > STD) \&\& (MSB[be] == MSB[hs] == MSB[gq]) \\ 0, & \text{else} \end{cases}$$

where STD denotes the standard deviation of pixel data of the first line and third line, and Y_dir denotes the first edge direction.

In one embodiment, the differences between both pixel data divided by the first edge direction as an edge boundary are computed by $bv=|B-V|, xe=|X-E|, bx=|B-X|,$ $ve=|V-E|, bu=|B-U|, ye=|Y-E|,$ $by=|B-Y|, ue=|U-E|, bt=|B-T|,$ $ze=|Z-E|, ct=|C-T|, zd=|Z-D|,$ $az=|A-Z|, tf=|T-F|, bz=|B-Z|,$ $te=|T-E|$ $$W' = \begin{cases} (A+F)/2, & (Y\_dir = -1) \&\& (bx < STD) \&\& (ve < STD) \\ (C+D)/2, & (Y\_dir = 1) \&\& (bv < STD) \&\& (xe < STD) \\ (A+H+F+Q)/4, & (Y\_dir = -2) \&\& (by < STD) \&\& (ue < STD) \\ (C+L+P+D)/4, & (Y\_dir = 2) \&\& (bu < STD) \&\& (ye < STD) \\ (H+Q)/2, & (Y\_dir = -3) \&\& (bz < STD) \&\& (te < STD) \\ (L+P)/2, & (Y\_dir = 3) \&\& (bt < STD) \&\& (ze < STD) \\ (G+H+Q+S)/4, & (Y\_dir = -4) \&\& (az < STD) \&\& (tf < STD) \\ (L+M+N+P)/4, & (Y\_dir = 4) \&\& (ct < STD) \&\& (zd < STD) \\ (B+E)/2 & \text{else} \end{cases}$$

where STD denotes the standard deviation of pixel data of the first line and third line, Y_dir denotes the first edge direction, and W' denotes an interpolated value.

The predetermined first edge-determination condition and the first edge direction are used for determining whether directional edge dependent interpolation is to be conducted, and the predetermined second edge-determination condition and the final edge direction are used for performing simple linear interpolation in a high-frequency texture region.

The determined gradient direction includes low gradients below 45° to horizontal lines.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 2:
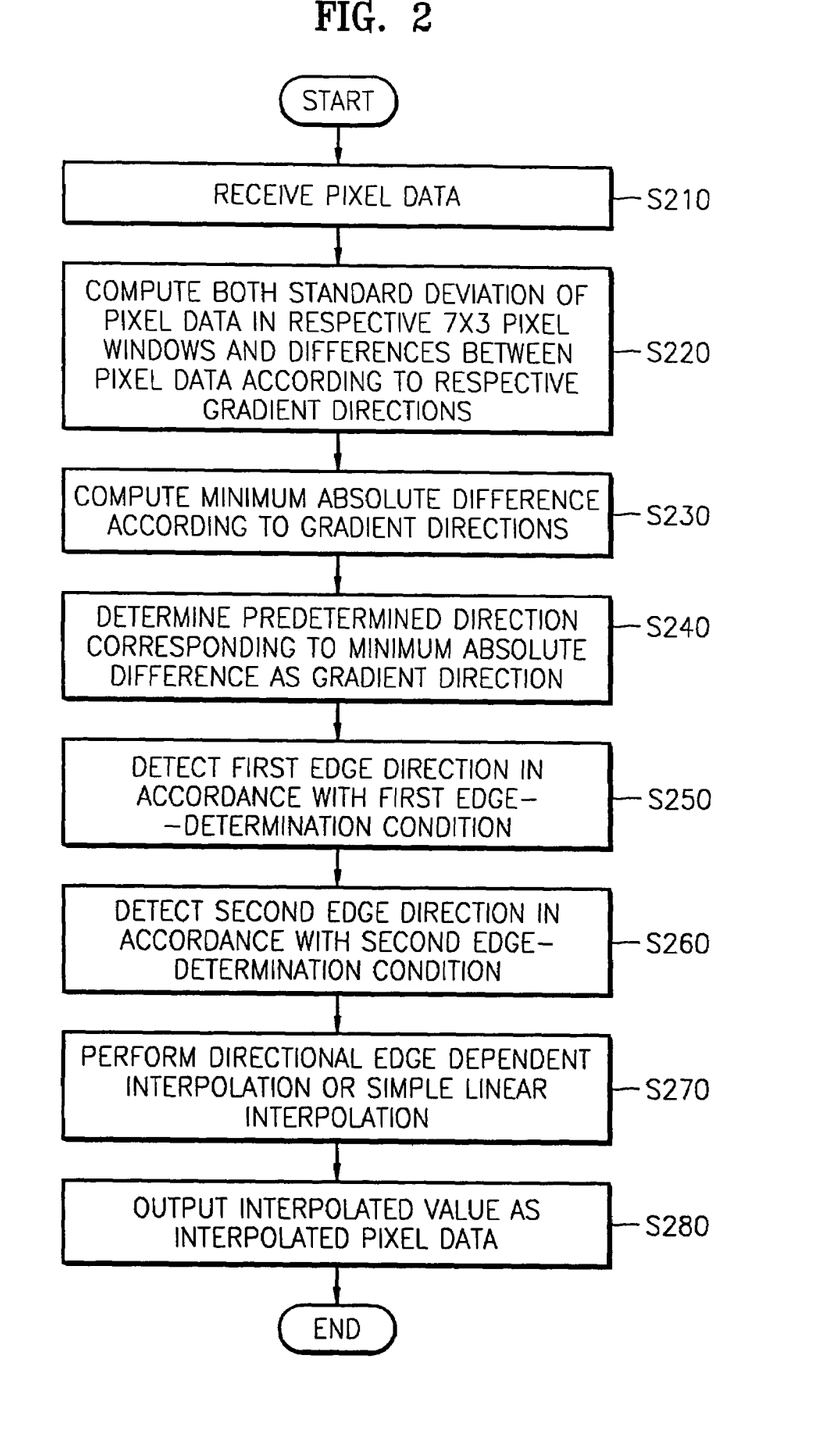
FIG. 2 is a flowchart illustrating a progressive scan method used in a display, according to an embodiment of the present invention.

FIG. 2 is a flowchart illustrating a progressive scan method used in a display, according to an embodiment of the present invention.

Referring to FIG. 2, a progressive scan method used in a display according to an embodiment of the present invention is implemented as will be described below, where the display includes a deinterlacer that receives field data of an interlaced scanning format and converts the field data of the interlaced scanning format into frame data of a progressive scanning format by performing spatial interpolation using edge dependent interpolation.

In the first step S210, the deinterlacer receives pixel data constituting field data. In the next step S220, the deinterlacer determines pixel windows with respect to respective center pixels that are to be interpolated to empty lines of the field data, i.e., determines 7×3 pixel windows, and computes a standard deviation of pixel data of lines of the field data other than the empty lines (hereinafter, briefly referred to as the standard deviation) in respective 7×3 pixel windows and differences between pixel data according to predetermined directions, i.e., nine gradient directions. The 7×3 pixel windows are shifted by one pixel (generally to the right, and if necessary, to the left) as center pixels to be interpolated are determined as neighboring pixels.

Figure 3:
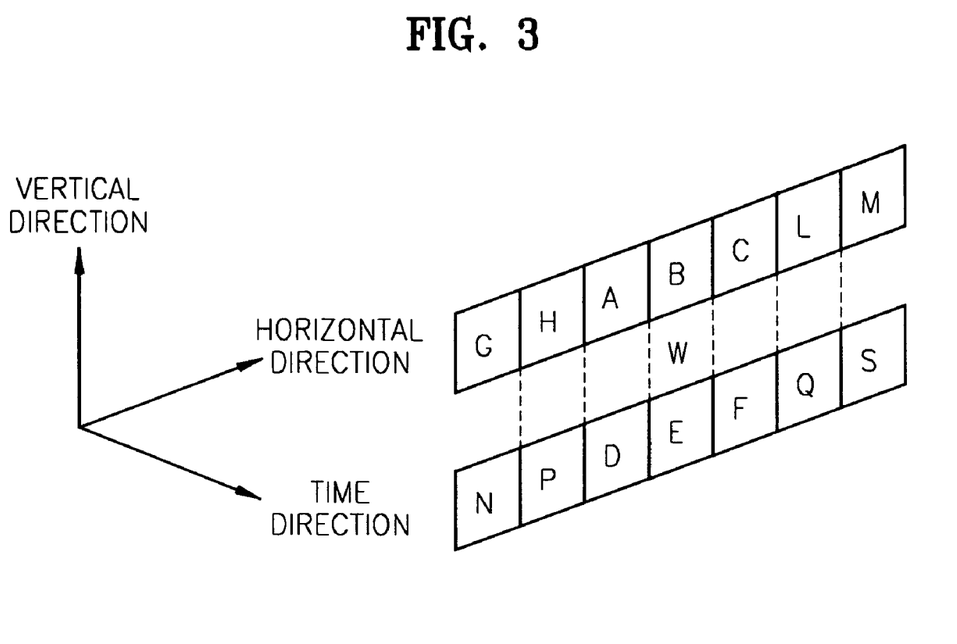
FIG. 3 is a diagram illustratiing a 7×3 pixel window as a unit block for edge dependent interpolation according to an embodiment of the present invention.

FIG. 3 is a view illustrating a 7×3 pixel window as a unit block for edge dependent interpolation according to an embodiment of the present invention.

Referring to FIG. 3, respective 7×3 pixel windows are formed of pixel data G, H, A, B, C, L, and M of the first line, pixel data N, P, D, E, F, Q, and S of the third line, and data W of a center pixel that is to be interpolated. Data W of the center pixel that is to be interpolated and pixel data T, U, V, X, Y, and Z of the empty line are equal to averaged values of pixel data corresponding to a first edge direction. In FIG. 3, pixel data received from outside is the field data, i.e., pixel data of the first and third horizontal lines. The pixel data of the empty line is data to be filled in the empty line by interpolation. Data W of the center pixel that is to be interpolated is interpolated into data W'. Here, the standard deviation is obtained by applying Equation 3 to pixel data of the lines of the field data other than the empty line, i.e., pixel data G, H, A, B, C, L, and M of the first line and pixel data N, P, D, E, F, Q, and S of the third line. That is, in Equation 3, let j range from 0 to 6, x (0,j) corresponds to pixel data G, H, A, B, C, L, and M, and x (1,j) corresponds to pixel data N, P, D, E, F, Q, and S.

$$STD(i, j) = \sqrt{\frac{1}{14}\sum_{i=0}^{1}\sum_{j=0}^{6}\{x(i, j)\}^2 - \frac{1}{14}\sum_{i=0}^{1}\sum_{j=0}^{6}x(i, j)} \quad (3)$$

Figure 4:
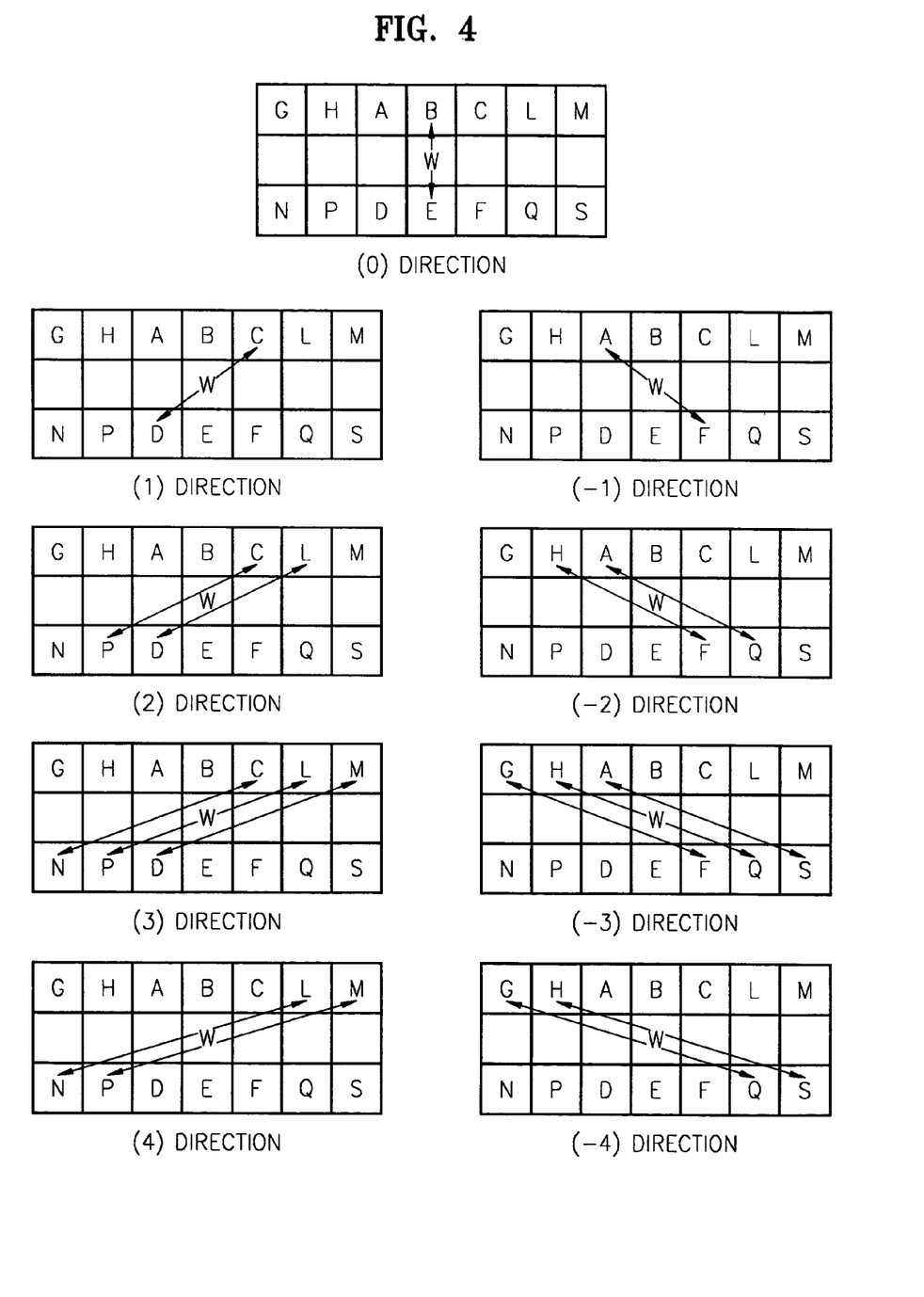
FIG. 4 is a diagram illustratiing nine gradient directions for edge dependent interpolation according to an embodiment of the present invention.

FIG. 4 is a view illustrating nine gradient directions for edge dependent interpolation according to an embodiment of the present invention.

Referring to FIG. 4, the predetermined directions mean nine gradient directions including (0) direction, (1) direction, (−1) direction, (2) direction, (−2) direction, (3) direction, (−3) direction, (4) direction, and (−4) direction. Here, according to (0) direction, pixels including pixel data (B, E) are connected at right angles to a horizontal direction, in which pixel data (B, E) are positioned immediately above and below data W of the center pixel that is to be interpolated. According to (1) direction, pixels including pixel data (C, D) are connected at angles of 45° to the horizontal direction, in which pixel data (C, D) are separated by one pixel to the right and to the left, respectively, from pixel data positioned above and below data W of the center pixel that is to be interpolated. According to (−1) direction, pixels including pixel data (A, F) are connected at angles of 135° to the horizontal direction, in which pixel data (A, F) are separated by one pixel to the left and to the right, respectively, from pixel data positioned immediately above and below data W of the center pixel, which is to be interpolated. The other directions, i.e., (2) direction, (−2) direction, (3) direction, (−3) direction, (4) direction, and (−4) direction, are determined as shown in FIG. 4. In FIG. 4, cases where pixel data connected at the same angle to the horizontal line are grouped as an identical direction, and the number of pixel data indicating each direction may be 4 or 6. In particular, (4) direction and (−4) direction are indicated by pixel data connected at angles of 27° to the horizontal line. Here, edge dependent interpolation is performed with respect to the direction of a gradient of 27° in a 7×3 pixel window, but can be performed more finely in a 9×3 pixel window or 11×3 pixel window with directions of smaller gradients.

Figure 5:
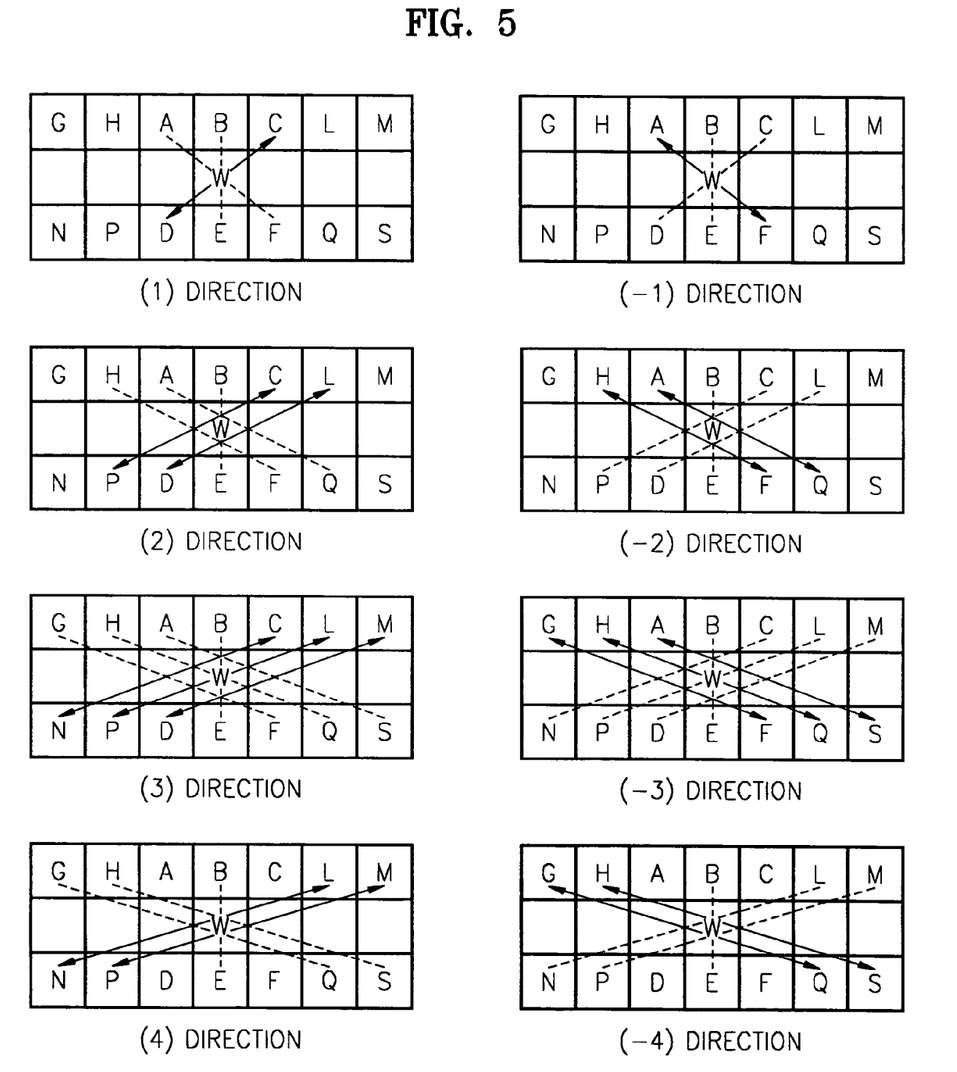
FIG. 5 is a diagram illustratiing computing of differences between pixel data with respect to respective gradient directions according to an embodiment of the present invention.

FIG. 5 is a view illustrating computation of differences between pixel data with respect to respective gradient directions according to an embodiment of the present invention.

Referring to FIG. 5, the differences between pixel data with respect to respective gradient directions according to an embodiment of the present invention indicate differences between pixel data indicating nine gradient directions (including (0) direction of FIG. 4) and are computed as follows.

$$af=A-F, be=B-E, cd=C-D, aq=A-Q, hf=H-F, cp=C-P$$

$$ld=L-D, as=A-S, hq=H-Q, gf=G-F, cn=C-N, lp=L-P$$

$$md=M-D, hs=H-S, gq=G-Q, mp=M-P, ln=L-N \quad (4)$$

After computing the standard deviation and the differences between pixel data according to respective gradient directions in step S220, the deinterlacer computes the minimum absolute difference according to gradient directions in step S230 and determines a predetermined direction corresponding to the minimum absolute difference as a gradient direction in step S240. In step S250, the deinterlacer detects a first edge direction where the standard deviation, the differences between pixel data according to respective gradient directions, and the determined gradient direction satisfy a predetermined first edge-determination condition.

Here, the absolute differences are computed as follows. As shown in the following equation, when the number of pixel data indicating one gradient direction is 4 or more, the absolute difference is equal to an averaged value of at least 2 absolute differences between pixel data.

$$a'=|af|, \ b'=|be|, \ c'=|cd|,$$

$$d'=(|aq|+|hf|)/2, \ e'=(|cp|+|ld|)/2,$$

$$f'=(|as|+|hq|+|gf|)/3, \ g'=(|cn|+|lp|+|md|)/3,$$

$$h'=(|hs|+|gq|)/2, \ i'=(|ln|+|mp|)/2 \quad (5)$$

The predetermined first edge-determination condition and the first edge direction are computed by using the minimum absolute difference obtained from Equation 5 as follows.

$$\text{Min}=\min(a',b',c',d',e',f',g',h',i') \quad (6)$$

interpolation in that an additional condition, such as the standard deviation, is further used to allow for edge dependent interpolation in consideration of the direction of a gradient of 27° at the minimum. That is, a direction corresponding to the minimum absolute difference obtained by Equation 6 is determined as a gradient direction, but the determined gradient direction is determined as the first edge direction only when the absolute differences between pixel data inclined in opposite directions to the direction corresponding to the minimum absolute difference are greater than the standard deviation. For example, to determine (−1) direction indicated by pixel data (A, F) as the first edge direction, the absolute value of be according to (0) direction and the absolute value cd according to (1) direction should be larger than the standard deviation. As shown in Equation 7, an additional condition is also used, whereby it is determined whether the differences between pixel data inclined in opposite directions to a direction corresponding to the minimum absolute difference (for example, in (−1) direction, be according to (0) direction, and cd according to (1) direction) have identical codes with each other. Here, this code determination is directed to determining whether gradient directions indicated by pixel data are identical. Since pixel data inclined in opposite directions to a direction corresponding to the minimum absolute difference should cross the direction corresponding to the minimum absolute difference (the direction of the edge), most significant bits (MSB) of the differences between pixel data inclined in opposite directions to the direction corresponding to the minimum absolute difference should be identical. This code determination is intended to suppress high-frequency noise that is introduced due to imprecise interpolation by determining (0) direction as the first edge direction when the gradient directions indicated by pixel data inclined in opposite directions to the direction corresponding to the minimum absolute difference are not identical, i.e., in relation to complex patterns or edges with significant luminance change.

$$Y\_dir = \begin{cases} -1, & (\text{Min} == a') \ \&\& \ (b' > STD) \ \&\& \ (c' > STD) \ \&\& \ (MSB[be] == MSB[cd]) \\ 1, & (\text{Min} == c') \ \&\& \ (a' > STD) \ \&\& \ (b' > STD) \ \&\& \ (MSB[af] == MSB[be]) \\ -2, & (\text{Min} == d') \ \&\& \ (b' > STD) \ \&\& \ (e' > STD) \ \&\& \ (MSB[be] == MSB[cp] == MSB[ld])) \\ 2, & (\text{Min} == e') \ \&\& \ (b' > STD) \ \&\& \ (d' > STD) \ \&\& \ (MSB[be] == MSB[aq] == MSB[hf])) \\ -3, & (\text{Min} == f') \ \&\& \ (b' > STD) \ \&\& \ (g' > STD) \ \&\& \ (MSB[be] == MSB[cn] == MSB[lp] == MSB[md])) \\ 3, & (\text{Min} == g') \ \&\& \ (b' > STD) \ \&\& \ (f' > STD) \ \&\& \ (MSB[be] == MSB[as] == MSB[hq] == MSB[gf])) \\ -4, & (\text{Min} == h') \ \&\& \ (b' > STD) \ \&\& \ (i' > STD) \ \&\& \ (MSB[be] == MSB[ln] = MSB[mp]))] \\ 4, & (\text{Min} == i') \ \&\& \ (b' > STD) \ \&\& \ (h' > STD) \ \&\& \ (MSB[be] == MSB[hs] == MSB[gq]) \\ 0, & \text{else} \end{cases} \quad (7)$$

where STD denotes the standard deviation of pixel data of the first line and third line, and Y_dir denotes the first edge direction.

As shown in Equation 7, the present invention is similar to conventional edge dependent interpolation in relation to the first edge-determination condition and the first edge direction, but is different from conventional edge dependent Finally, the deinterlacer detects the final edge direction where the standard deviation, the first edge direction, and the absolute difference between pixel data divided by the first edge direction as the edge boundary satisfy the second edge-determination condition in step S260, performs edge dependent interpolation or simple linear interpolation according to the final edge direction in step S270, and then outputs an interpolated value as interpolated pixel data in step S280.

Figure 6:
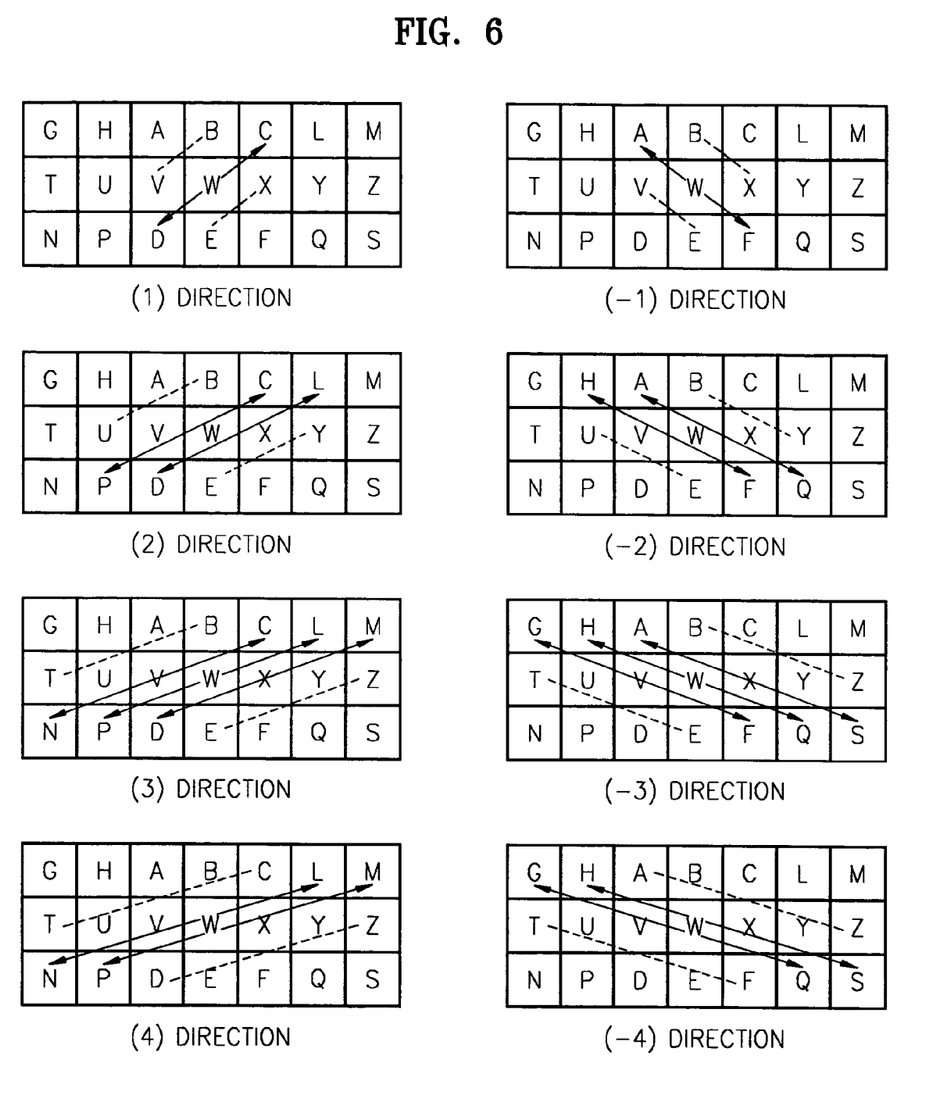
FIG. 6 is a diagram illustratiing a final edge-determination condition for edge dependent interpolation according to an embodiment of the present invention.

FIG. 6 is a view illustratiing a final edge-determination condition for edge dependent interpolation according to an embodiment of the present invention.

Referring to FIG. 6, data W of the center pixel that is to be interpolated and data T, U, V, X, Y, Z of the center pixel to fill in the empty lines are equal to averaged values of pixel data corresponding to the first edge direction obtained based on Equation 7. Namely, in FIG. 6, if the first edge direction is (0) direction, data W is equal to (B+E)/2. If the first edge direction is (1) direction, data W is equal to (C+D)/2. If the first edge direction is (2) direction, data W is equal to (C+L+P+D)/4. If the first edge direction is (3) direction, data W is equal to (C+L+M+N+P+D)/6. If the first edge direction is (4) direction, data W is equal to (L+M+N+P)/4. Accordingly, it is possible to obtain data W according to negative directions such as (−1) direction and obtain data T, U, V, X, Y, and Z of the center pixel that is to be interpolated as the 7×3 pixel window is shifted.

Thus, respective absolute differences between pixel data divided by the first edge direction that is used as the edge boundary are given by $$bv=|B-V|,\ xe=|X-E|,\ bx=|B-X|,$$
$$ve=|V-E|,\ bu=|B-U|,\ ye=|Y-E|,$$
$$by=|B-Y|,\ ue=|U-E|,\ bt=|B-T|,$$
$$ze=|Z-E|,\ ct=|C-T|,\ zd=|Z-D|,$$
$$az=|A-Z|,\ tf=|T-F|,\ bz=|B-Z|,$$
$$te=|T-E| \quad (8)$$

In addition, the second edge-determination condition and the interpolated value are given by $$W' = \begin{cases} (A+F)/2, & (Y\_dir=-1)\ \&\&\ (bx<STD)\ \&\&\ (ve<STD) \\ (C+D)/2, & (Y\_dir=1)\ \&\&\ (bv<STD)\ \&\&\ (xe<STD) \\ (A+H+F+Q)/4, & (Y\_dir=-2)\ \&\&\ (by<STD)\ \&\&\ (ue<STD) \\ (C+L+P+D)/4, & (Y\_dir=2)\ \&\&\ (bu<STD)\ \&\&\ (ye<STD) \\ (H+Q)/2, & (Y\_dir=-3)\ \&\&\ (bz<STD)\ \&\&\ (te<STD) \\ (L+P)/2, & (Y\_dir=3)\ \&\&\ (bt<STD)\ \&\&\ (ze<STD) \\ (G+H+Q+S)/4, & (Y\_dir=-4)\ \&\&\ (az<STD)\ \&\&\ (tf<STD) \\ (L+M+N+P)/4, & (Y\_dir=4)\ \&\&\ (ct<STD)\ \&\&\ (zd<STD) \\ (B+E)/2 & \text{else} \end{cases} \quad (9)$$

where STD denotes the standard deviation of pixel data of the first line and third line, Y_dir denotes the first edge direction, and W' denotes an interpolated value.

As shown in Equation 9, the present invention is similar to conventional edge dependent interpolation in relation to the second edge-determination condition and the final edge direction, but is different from conventional edge dependent interpolation in that an additional condition, such as the standard deviation, is further included to allow for edge dependent interpolation in consideration of the direction of a gradient of 27° at the minimum and to allow for simple linear interpolation {(B+E)/2} in a high-frequency texture region with complex patterns and significant luminance change. That is, a direction determined based on Equation 7 is determined as the first edge direction only when the absolute differences between pixel data divided by the first edge direction that is used as the edge boundary are smaller than the standard deviation.

As described above, a progressive scan method used in a display according to an embodiment of the present invention is implemented as follows, where the display includes a deinterlacer that receives field data of an interlaced scanning format and converts the field data of the interlaced scanning format into frame data of a progressive scanning format by performing spatial interpolation using edge dependent interpolation. In the first step S210, the deinterlacer receives pixel data constituting field data. In the next step S220, the deinterlacer determines pixel windows with respect to respective center pixels that are to be interpolated to empty lines and computes a standard deviation of pixel data of the lines of the field data other than the empty lines in the respective pixel windows and computes differences between pixel data according to respective gradient directions. Thereafter, the deinterlacer computes the minimum absolute difference according to predetermined directions in step S230 and determines a direction corresponding to the minimum absolute difference as a gradient direction in step S240. In step S250, the deinterlacer detects a first edge direction where the standard deviation, the differences between pixel data according to the predetermined directions, and the determined gradient direction satisfy a predetermined first edge-determination condition. Finally, the deinterlacer detects a final edge direction where the standard deviation, the first edge direction, and the absolute difference between pixel data divided by the first edge direction that is used as the edge boundary satisfy the second edge-determination condition in step S260, performs edge dependent interpolation or simple linear interpolation according to the final edge direction in step S270, and then outputs an interpolated value as interpolated pixel data, in step S280.

A progressive scan method used in a display according to the present invention detects the final edge direction that satisfies the first edge-determination condition and the second edge-determination condition by performing interpolation for 7×3 pixel windows, using code determination and a comparison of the standard deviation based on the differences between luminances of pixel data divided by an edge boundary. Thus, directional edge interpolation is carried out in a region of a low gradient below 45° and to 27° at the minimum, and simple intra-field linear interpolation can be performed in a high-frequency texture region. Subsequently, it is possible to remove high-frequency noise introduced in edge dependent interpolation or unnatural screen display due to zigzagged edges, thereby improving the quality of a display.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A progressive scan method used in a display including a deinterlacer that receives field data of an interlaced scanning format and converts the received field data into frame data of a progressive scanning format, the progressive scan method comprising:
   receiving pixel data forming field data;
   determining predetermined pixel windows with respect to respective center pixels that are to be interpolated to empty lines of the field data and computing a standard deviation of pixel data of the lines of the field data other than the empty lines in respective pixel windows and computing the differences between pixel data according to predetermined directions;
   computing the minimum absolute difference according to predetermined directions;
   determining a direction corresponding to the minimum absolute difference as a gradient direction among the predetermined directions;
   detecting a first edge direction where the standard deviation, the differences between pixel data according to the predetermined directions, and the determined gradient direction satisfy a predetermined first edge-determination condition;
   detecting a final edge direction where the standard deviation, the first edge direction, and the differences between pixel data divided by the first edge direction that is used as an edge boundary satisfy a predetermined second edge-determination condition; and
   outputting an interpolated value corresponding to the final edge direction as interpolated pixel data.

2. The progressive scan method of claim 1, wherein when the predetermined pixel windows have a size of 7×3 where there are pixel data G, H, A, B, C, L, and M of the first line, pixel data N, P, D, E, F, Q, and S of the third line, and pixel data T, U, V, W, X, Y, and Z of an empty line which are equal to averaged values of pixel data corresponding to the first edge direction, the number of predetermined directions is 9, and the differences between pixel data according to the predetermined directions, the absolute differences, the predetermined first edge-determination condition, the first edge direction, the differences between both pixel data divided by the first edge direction that is used as an edge boundary, the predetermined second edge-determination condition, and the final edge direction are determined by predetermined equations.

3. The progressive scan method of claim 2, wherein the differences between pixel data according to the predetermined directions are computed as follows:

$$af=A-F, be=B-E, cd=C-D, aq=A-Q, hf=H-F, cp=C-P$$

$$ld=L-D, as=A-S, hq=H-Q, gf=G-F, cn=C-N, lp=L-P$$

$$md=M-D, hs=H-S, gq=G-Q, mp=M-P, ln=L-N$$

and the absolute differences are computed as follows:

$$a'=|af|,\ b'=|be|,\ c'=|cd|,$$

$$d'=(|aq|+|hf|)/2,\ e'=(|cp|+|ld|)/2,$$

$$f'=(|as|+|hq|+|gf|)/3,\ g'=(|cn|+|lp|+|md|)/3,$$

$$h'=(|hs|+|gq|)/2,\ i'=(|ln|+|mp|)/2$$

and the predetermined first edge-determination condition and the first edge direction are computed as follows:

$$\text{Min} = \min(a',b',c',d',e',f',g',h',i')$$

$$STD(i,j) = \sqrt{\frac{1}{14}\sum_{i=0}^{1}\sum_{j=0}^{6}\{x(i,j)\}^2 - \frac{1}{14}\sum_{i=0}^{1}\sum_{j=0}^{6}x(i,j)}$$

$$Y\_dir = \begin{cases} -1, & (\text{Min}==a')\ \&\&\ (b'>STD)\ \&\&\ (c'>STD)\ \&\&\ (MSB[be]==MSB[cd]) \\ 1, & (\text{Min}==c')\ \&\&\ (a'>STD)\ \&\&\ (b'>STD)\ \&\&\ (MSB[af]==MSB[be]) \\ -2, & (\text{Min}==d')\ \&\&\ (b'>STD)\ \&\&\ (e'>STD)\ \&\&\ (MSB[be]==MSB[cp]==MSB[ld])) \\ 2, & (\text{Min}==e')\ \&\&\ (b'>STD)\ \&\&\ (d'>STD)\ \&\&\ (MSB[be]==MSB[aq]==MSB[hf])) \\ -3, & (\text{Min}==f')\ \&\&\ (b'>STD)\ \&\&\ (g'>STD)\ \&\&\ (MSB[be]==MSB[cn]==MSB[lp]==MSB[md])) \\ 3, & (\text{Min}==g')\ \&\&\ (b'>STD)\ \&\&\ (f'>STD)\ \&\&\ (MSB[be]==MSB[as]==MSB[hq]==MSB[gf])) \\ -4, & (\text{Min}==h')\ \&\&\ (b'>STD)\ \&\&\ (i'>STD)\ \&\&\ (MSB[be]==MSB[ln]=MSB[mp]))] \\ 4, & (\text{Min}==i')\ \&\&\ (b'>STD)\ \&\&\ (h'>STD)\ \&\&\ (MSB[be]==MSB[hs]==MSB[gq]) \\ 0, & \text{else} \end{cases}$$

where STD denotes the standard deviation of pixel data of the first line and third line, and Y_dir denotes the first edge direction.

4. The progressive scan method of claim 2, wherein the differences between both pixel data divided by the first edge direction that is used as an edge boundary are computed as follows:

$$bv=|B-V|,\ xe=|X-E|,\ bx=|B-X|,$$

$$ve=|V-E|,\ bu=|B-U|,\ ye=|Y-E|,$$

$$by=|B-Y|,\ ue=|U-E|,\ bt=|B-T|,$$

$$ze=|Z-E|,\ ct=|C-T|,\ zd=|Z-D|,$$

$$az=|A-Z|,\ tf=|T-F|,\ bz=|B-Z|,$$

$$te=|T-E|$$

and the second edge-determination condition and an interpolated value are computed as follows:

$$W' = \begin{cases} (A+F)/2, & (Y\_dir=-1)\ \&\&\ (bx<STD)\ \&\&\ (ve<STD) \\ (C+D)/2, & (Y\_dir=1)\ \&\&\ (bv<STD)\ \&\&\ (xe<STD) \\ (A+H+F+Q)/4, & (Y\_dir=-2)\ \&\&\ (by<STD)\ \&\&\ (ue<STD) \\ (C+L+P+D)/4, & (Y\_dir=2)\ \&\&\ (bu<STD)\ \&\&\ (ye<STD) \\ (H+Q)/2, & (Y\_dir=-3)\ \&\&\ (bz<STD)\ \&\&\ (te<STD) \\ (L+P)/2, & (Y\_dir=3)\ \&\&\ (bt<STD)\ \&\&\ (ze<STD) \\ (G+H+Q+S)/4, & (Y\_dir=-4)\ \&\&\ (az<STD)\ \&\&\ (tf<STD) \\ (L+M+N+P)/4, & (Y\_dir=4)\ \&\&\ (ct<STD)\ \&\&\ (zd<STD) \\ (B+E)/2 & \text{else} \end{cases}$$

where STD denotes the standard deviation of pixel data of the first line and third line, Y_dir denotes the first edge direction, and W' denotes the interpolated value.

5. The progressive scan method of claim 2, wherein the predetermined first edge-determination condition and the first edge direction are used for determining whether directional edge dependent interpolation is to be conducted, and the predetermined second edge-determination condition and the final edge direction are used for performing simple linear interpolation in a high-frequency texture region.

6. The progressive scan method of claim 1, wherein the predetermined first edge-determination condition and the first edge direction are used for determining whether directional edge dependent interpolation is to be conducted, and the predetermined second edge-determination condition and the final edge direction are used for performing simple linear interpolation in a high-frequency texture region.

7. The progressive scan method of claim 1, wherein the determined gradient direction includes low gradients below 45° to horizontal lines.

* * * * *